United States Patent [19]

Shultz

[11] 4,023,940
[45] May 17, 1977

[54] REGENERATION CYCLE CONTROL FOR INDUSTRIAL AIR DRYER

[75] Inventor: Gilbert F. Shultz, Novi, Mich.

[73] Assignee: Whitlock, Inc., Farmington, Mich.

[22] Filed: July 2, 1975

[21] Appl. No.: 592,375

[52] U.S. Cl. .................................. 55/163; 55/179; 55/208

[51] Int. Cl.² ...................................... B01D 53/04

[58] Field of Search ................ 55/20, 23, 163, 179, 55/208

[56] References Cited

UNITED STATES PATENTS

| 2,561,441 | 7/1951 | Lou | 55/163 |
|---|---|---|---|
| 3,359,706 | 12/1967 | Zankey | 55/163 X |
| 3,584,441 | 6/1971 | Staimling | 55/208 X |

Primary Examiner—John Adee
Attorney, Agent, or Firm—Kinzer, Plyer, Dorn & McEachran

[57] ABSTRACT

A regeneration cycle control for a dessicant air dryer of the kind in which regeneration is effected by passing heated air through the bed; a thermal sensor senses the bed outlet temperature and de-energizes the regeneration air heater when a given outlet temperature T1 is reached, after which regeneration air flow is continued to cool the bed to a lower temperature T2, at which point the regeneration cycle is terminated and on-stream operation resumed. In a dual-bed dryer, the beds are maintained alternately in on-stream mode and regeneration mode.

8 Claims, 9 Drawing Figures

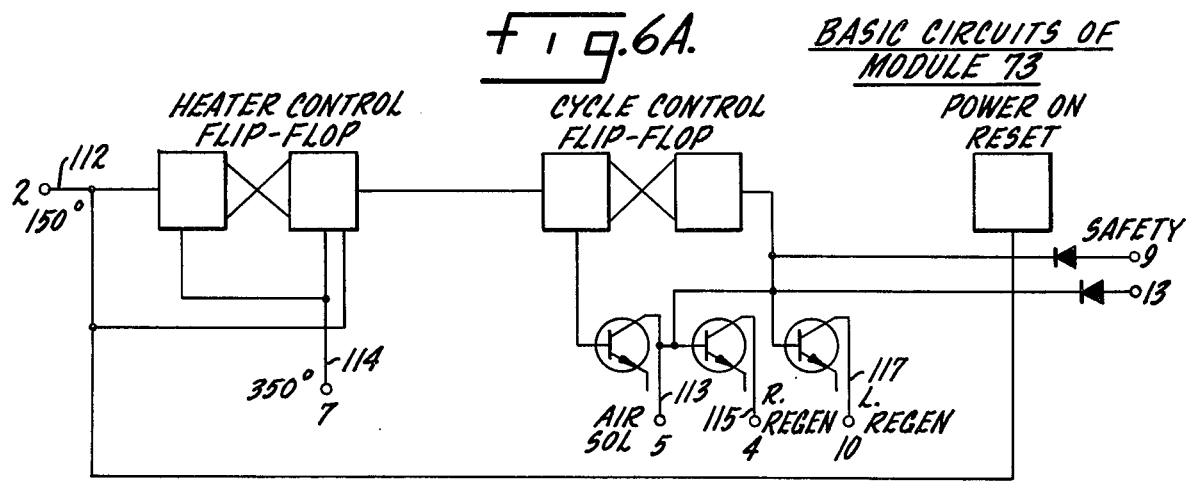
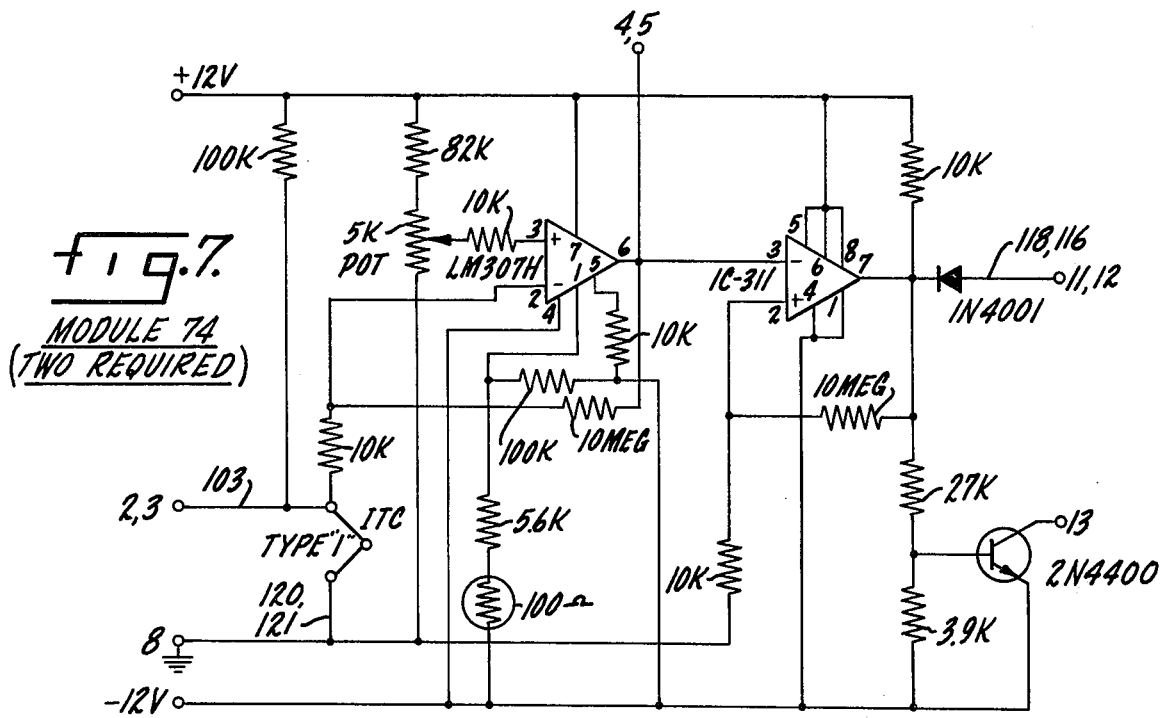
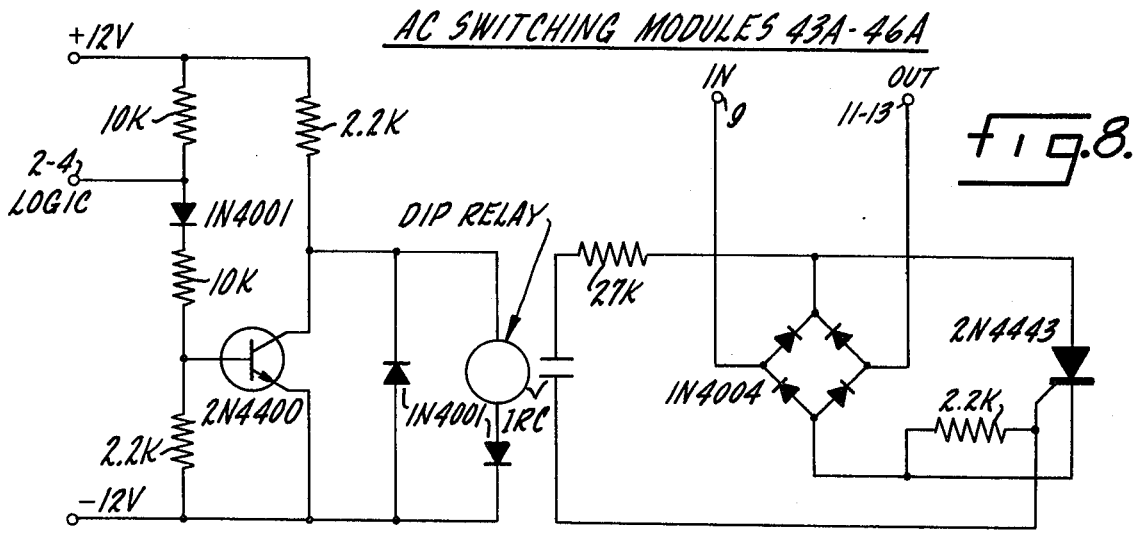

REGENERATION CYCLE CONTROL FOR INDUSTRIAL AIR DRYER

BACKGROUND OF THE INVENTION

There are a variety of industrial processes and other applications in which a supply of essentially moisture-free gas, usually dry air, is necessary. One critical example is the drying of hygroscopic plastic materials, such as nylons and other polycarbonates, which are extremely moisture-absorbent; moisture penetrates the surface of these materials to form a molecular bond with the plastic. Experience has demonstrated that the dew point of the drying air must be maintained below −40° F. to achieve a moisture level of less than 0.05% as required for satisfactory molding or like processing of the plastic.

Dessicant dryers have proved highly satisfactory in the drying of air and other gases for use in such industrial processes. The preferred dessicant material is a molecular sieve, comprising minute beads of material having a high affinity for water vapor molecules or ions in the air or other process gas. Eventually, the molecular sieve dessicant becomes saturated with moisture and must be re-generated. Regeneration is accomplished by passing a limited quantity of very hot air (e.g., 550° F.) through the molecular sieve. These dryers usually include two "beds" or canisters of dessicant material; one bed is maintained on-stream to provide the required supply of dry heated air while the other bed is being regenerated for later use.

The regeneration cycle for dessicant dryers of the kind described above has customarily been controlled by timers. Timing control of the regeneration cycle affords satisfactory results in many applications, but is subject to some difficulties and disadvantages because the control is only approximate. Thus, a substantial variation in the humidity or temperature of the regeneration air supply may produce an appreciable change in the drying of the dessicant beds; that is, the regeneration cycle may be terminated before the bed is as dry as it should be or may continue beyond the stage at which the bed is dry enough for further on-stream use. A substantial variation in the available electrical supply, sufficient to affect the heat output of the regeneration air heaters, may also cause a variation in the effectiveness of the regeneration cycle. If over-drying occurs, the result is a waste of power; if the dessicant beds are not dried sufficiently, the process to which the dehumidified air is supplied may be adversely affected.

SUMMARY OF THE INVENTION

It is a principal object of the present invention, therefore, to provide a new and improved automatic control for the regeneration cycle of a dessicant dryer that is actuated in accordance with variations in a parameter that indicates the actual moisture conditions in the dessicant bed and that affords consistent regeneration despite relatively wide variations in the available regeneration air supply, or the electrical supply.

Another object of the invention is to provide a new and improved thermal control for the regeneration cycle of a dessicant dryer that is highly reliable and consistent in operation over a broad range of varying operating conditions.

A particular object of the invention is to provide a simple and economical regeneration cycle control for a dessicant dryer, in which basic control is determined by sensing the outlet temperature of the dryer during the regeneration cycle.

Accordingly, the invention relates to a regeneration cycle control for a gas dryer of the kind comprising first and second dessicant beds each having an inlet and an outlet, first and second regeneration heaters in the respective bed inlets, and valve means, connected to the bed inlets and the bed outlets, actuatable between alternate operating conditions including a first operating condition, in which the first bed is in an on-stream mode with its outlet connected to a process apparatus gas intake and its inlet connected to the exhaust of the process apparatus and the second bed is in a regeneration mode with its outlet diverted from the process apparatus and its inlet connected to a regeneration air supply, and a second operating condition in which the inlet and outlet connections of the beds are reversed with the first bed in regeneration mode and the second bed in on-stream mode. The cycle control comprises bed outlet thermal sensor means for sensing the bed outlet temperature for each bed when the bed is in its regeneration mode. Valve control means are provided for actuating the valve means between the first and second operating conditions. The conrol includes heater control means, having inputs from the bed outlet thermal sensor means and from the valve control means, for energizing the regeneration heater of the bed that is in its regeneration mode, following the initiation of an operating cycle, until the outlet temperature of that bed increases to a first level T1, and then de-energizing that regeneration heater. The valve control means has inputs from the bed outlet thermal sensor means and from the heater control means, and actuates the valve means to its alternate operating condition to initiate a new cycle, following de-energization of the regeneration heater, when the bed outlet temperature is reduced to a second temperature T2, where T1 > T2.

BRIEF DESCRIPTION OF THE DRAWINGS

FIGS. 3 through 8 are circuit diagrams of the individual operating modules for the control system illustrated in FIG. 2.

DESCRIPTION OF THE PREFERRED EMBODIMENTS

Figure 1:
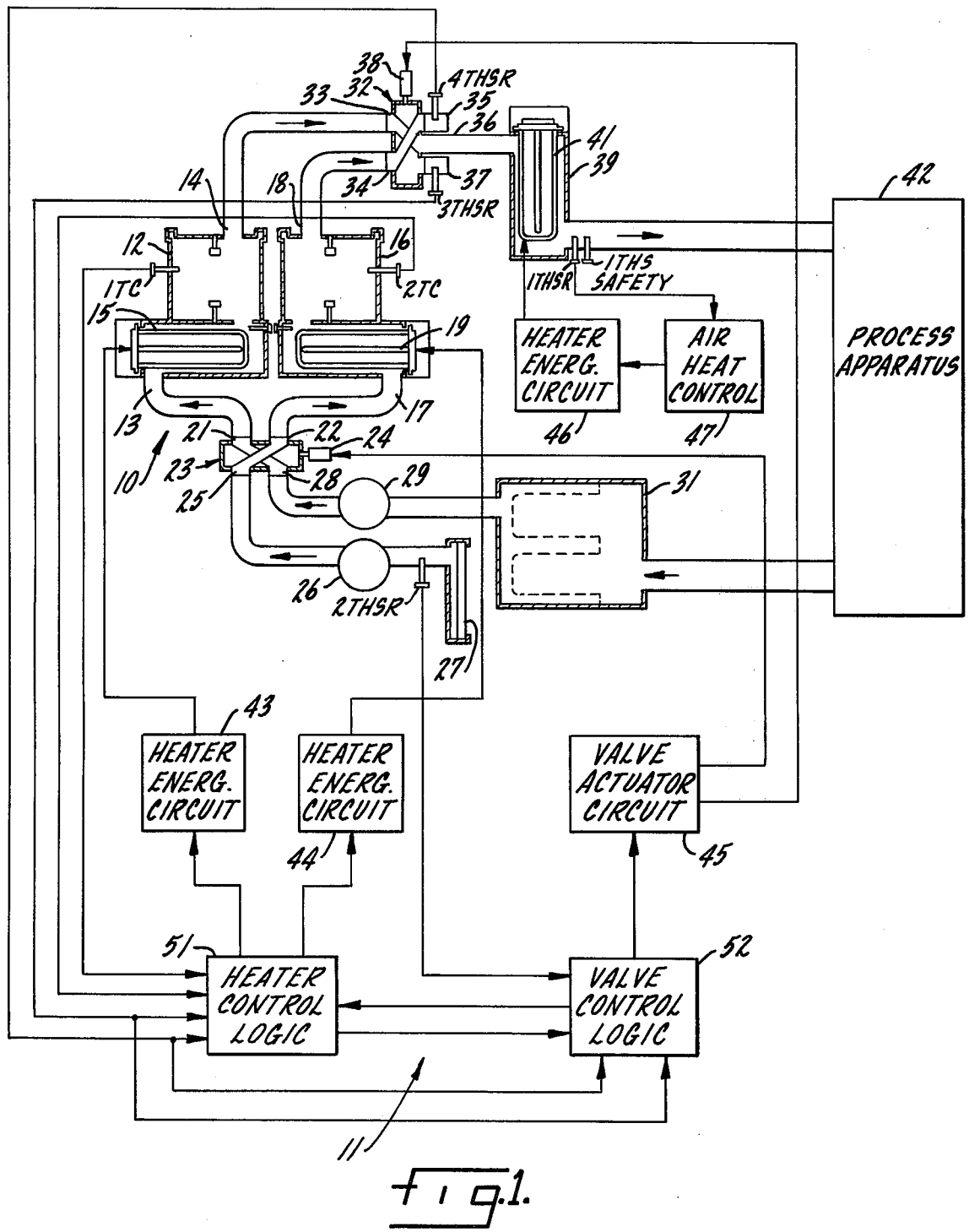
FIG. 1 is a schematic block diagram of a dual-bed dessicant dryer illustrating, in relatively simplified form, one embodiment of a regeneration cycle control constructed in accordance with the present invention.

FIG. 1 illustrates a dual-bed dehumidifying dessicant dryer 10 of essentially conventional construction, together with a regeneration cycle control system 11 for the dryer, the control system 11 comprising a simplified representation of one embodiment of the present invention.

Dryer 10 comprises a first dessicant bed 12 having an inlet 13 and an outlet 14. An electrical regeneration heater 15 is incorporated in the bed inlet 13. Dryer 10 further comprises a second dessicant bed 16 having an inlet 17 and an outlet 18 with a regeneration heater 19 in the inlet 17. The inlets 13 and 17 to the dessicant beds 12 and 16 are connected to the outlet ports 21 and 22, respectively, of an air direction control valve 23 operated by a solenoid 24. One inlet port 25 for valve 23 is connected to a regeneration air blower 26, the inlet to blower 26 being connected to the atmosphere through a filter 27. The other inlet port 28 of valve 23 is connected to a process air blower 29, the inlet of blower 29 being connected to a process air filter 31.

Dryer 10 includes a second air direction control valve 32 having two inlet ports 33 and 34 and three outlet ports 35, 36 and 37, the valve being operated by a solenoid 38. The outlet 14 of dessicant bed 12 is connected to one valve inlet port 33 and the outlet 18 of the other dessicant bed 16 is connected to the other valve inlet port 34. Outlet ports 35 and 37 are both vented to the atmosphere and the remaining outlet port 36 is connected to the inlet of a process air heater 39 containing an electrical heater element 41. The outlet of heater 39 is connected to the inlet of a process apparatus 42. Apparatus 42 may comprise any process equipment requiring a supply of dry heated air, as, for example, a plenum drying hopper employed for the drying of granular plastic or like materials. Process apparatus 42 has an exhaust outlet connected to the inlet of filter 31.

The regeneration heater 15 for the first dessicant bed 12 is electrically connected to a heater energizing circuit 43. Similarly, the regeneration air heater 19 for the second dessicant bed 16 is electrically connected to a heater energizing circuit 44. An appropriate valve actuator circuit 45 is provided for dryer 10, and is electrically connected to the two solenoids 24 and 38 that operate the directional air control valves 23 and 32.

The electrical heating element 41 of the process air heater 39 is electrically connected to a heater energizing circuit 46. A thermal sensor 1THSR, which may comprise a thermistor, a thermocouple, or other temperature sensing element, is located in the outlet of heater 39 and is electrically connected to an air heat control circuit 47. The air heat control 47 is electrically connected to heater energizing circuit 46. An additional thermal sensor 1THS may be connected into the outlet of the process air heater 39 to afford a safety control for shutting down the dryer; the safety circuits are not illustrated in FIG. 1.

As thus far described, the apparatus of FIG. 1, and particularly dryer 10, is generally conventional in construction. For a further description of the operating characteristics of a dryer of this kind, reference may be made to Catalog Section G, Form 9165, of Whitlock Inc., and particularly the portions of that catalog section describing the Whitlock CL Series dehumidifying dryers.

The regeneration cycle control 11 of FIG. 1 comprises a heater control logic circuit 51 having two outputs electrically connected to the two heater energizing circuits 43 and 44. Control 11 further includes a valve control logic circuit 52 having an output connected to the valve actuator circuit 45. Each of the control logic circuits 51 and 52 has an outlet circuit connection to the other.

A thermal sensor 4THSR is mounted in the output port 35 of the directional air control valve 32. Sensor 4THSR is utilized to sense the outlet temperature for the first dessicant bed 12 when bed 12 is in its regeneration mode of operation as described hereinafter. Sensor 4THSR is electrically connected to an input for the heater control logic 51, and is also connected to an input for valve control logic 52. A second similar bed outlet thermal sensor 3THSR is connected to the output port 37 of valve 32 and is utilized to sense the outlet temperature for dessicant bed 16 when that bed is in its regeneration mode. Like sensor 4THSR, sensor 3THSR is connected to input circuits for the heater control logic 51 and the valve control logic 52. Sensors 3THSR and 4THSR may comprise thermistors, as in the embodiment described in detail in connection with FIG. 3; on the other hand, thermocouples or other thermal sensing devices may be employed if desired.

A thermocouple or other temperature sensing device 1TC is mounted in the first dessicant bed 12 in position to sense the bed temperature. The thermal sensor 1TC is electrically connected to an input for the heater control logic 51. A similar thermocouple or other temperature sensing device 2TC is provided for the other dessicant bed 16 and is connected to an input for heater control logic 51.

Control system 11 may also include an additional thermal sensor 2THSR connected to the inlet of blower 26, where it senses the temperature of the regeneration air supply. Sensor 2THSR may comprise a thermistor; other thermal sensing devices can be used as desired. Sensor 2THSR is electrically connected to an input for heater control logic 51.

When the directional control valves 23 and 32 are in the operating positions illustrated in FIG. 1, the first dessicant bed 12 is in its on-stream mode with bed outlet 14 connected to the gas intake of process apparatus 42 through valve 32 and process air heater 39. The inlet 13 of bed 12, the on-stream bed, is connected to the exhaust of process apparatus 42 through filter 31, blower 29, and valve 23, affording a closed loop for the drying operation. For this first operating condition of dryer 10, the second dessicant bed 16 is in its regeneration mode with its outlet 18 diverted from the process apparatus 42 and vented to the atmosphere through outlet port 35 of valve 32. If it is assumed that valves 23 and 32 have just been actuated to the illustrated operating positions, it is seen that an on-stream drying cycle has been initiated for dessicant bed 12 and a regeneration cycle has simultaneously been initiated for dessicant bed 16.

During its on-stream cycle, the first dessicant bed 12 receives cool, wet air from process apparatus 42, through filter 31, blower 29, and valve 23. Moisture is absorbed from the relatively saturated air by the molecular sieve dessicant in bed 12 and the dried air passes out of the bed through valve 32 and into the process air heater 39. In heater 39, the stream of air is continuously heated to a thermostatically controlled temperature, the control being afforded by thermal sensor 1THSR, air heat control 47, and heater energizing circuit 46. From heater 39, the air passes through process apparatus 42, picking up moisture and losing heat, emerging from the process apparatus as the cool, wet input air to filter 31.

When valves 23 and 32 were actuated to establish the first dessicant bed 12 in its on-stream mode, also establishing the second bed 16 in its regeneration mode, this operation was signalled to heater control logic 51 from valve control logic 52. The heater control logic 51 then supplied an actuating signal to circuit 44, energizing the regeneration heater 19 in the inlet to bed 16.

From the outset of the regeneration cycle for bed 16, therefore, air is drawn from the atmosphere through filter 27 and blower 26, heated by heater 19, passed through the dessicant bed 16, and vented to the atmosphere through bed outlet 18 and ports 34 and 35 of valve 32. Heater 19 heats the regeneration air entering bed 16 to a relatively high temperature, which may be of the order of 550° F. As the heated air passes through bed 16, it absorbs moisture from the bed and is cooled substantially.

The bed outlet temperature for bed 16 is sensed continuously, while bed 16 is in its regeneration mode, by the thermal sensor 4THSR, and this information is applied to the heater control logic 51. As the heater regeneration air passing through bed 16 removes moisture from the bed, and the bed becomes progressively drier, the rate of heat absorption from the air, by the bed, decreases, and the bed outlet temperature sensed by thermal sensor 4THSR rises.

When the bed outlet temperature monitored by thermal sensor 4THSR reaches a first level T1, indicative of drying of the bed to a moisture content suitable for returning the bed to on-stream operation, heater control logic 51 signals heater energizing circuit 44 to de-energize regeneration heater 19. This action is also signalled to valve control logic 52. Temperature T1 should be selected in accordance with the operating characteristics of the molecular sieve dessicant; typically, it may be of the order of 350° F.

Thereafter, the regeneration cycle for bed 16 continues in a cool-down period, cooling of the bed being effected by the air from regeneration blower 26, which is no longer heated by heater 19. When the bed outlet temperature is reduced to a second temperature level T2, substantially lower than T1, the cooling of the bed is recognized by valve control logic 52, utilizing the output signal from thermal sensor 4THSR. When this occurs, an output signal from valve control logic 52 to valve actuator circuit 45 causes the valve actuator circuit to change the energization state of solenoids 24 and 38, reversing the directional control valves 23 and 32 to initiate a new cycle of operation. Temperature T2 may be adjusted to suit the characteristics of dryer 10 and process apparatus 42; in a given instance, T2 may be selected as 150° F.

In the new cycle, dessicant bed 16 operates in its on-stream mode. Thus, the intake to bed 16 is derived from filter 31 and blower 29, through ports 28 and 22 of valve 23 and bed inlet 17. The dehumidified air from bed 16 now passes through outlet 18 and ports 34 and 36 of valve 32 to process air heater 39, where the air is heated to the desired operating temperature for use in process apparatus 42. Again, it is seen that the on-stream mode of operation for bed 16 entails a closed loop.

In this new cycle bed 12 operates in the regeneration mode. At the beginning of the cycle, heater control logic 51 actuates circuit 43 to energize the regeneration air heater 15. Air is supplied through filter 27 and blower 26, valve ports 25 and 21, and inlet 13 to bed 12, being heated by heater 15. The regeneration air leaves bed 12 through outlet 14 and is vented to the atmosphere through ports 33 and 37 of valve 32. The outlet temperature for bed 12 is sensed by thermal sensor 3THSR, and a signal representative of that temperature is supplied to heater control logic 51 and valve control logic 52.

In regenerating bed 12, as in the case of bed 16, the bed outlet temperature measured by sensor 3THSR rises progressively as the bed is dried and ultimately reaches the temperature T1 indicative of adequate drying of the bed to a state suitable for a return to on-stream operation. At this point, heater control logic 51 actuates circuit 43 to de-energize regeneration heater 15. A cooling period follows, the bed being cooled by the continuing supply of air from blower 26. When bed is is cooled to the temperature T2, and hence is fully ready to return to on-stream operation, valve control logic 52 again signals valve actuator circuit 45 to actuate valves 23 and 32 and begin a new cycle under the initial operating conditions described above, with the valves in the positions shown in FIG. 1.

The dessicant materials within beds 12 and 16 are subject to damage from overheating, particularly when molecular sieve dessicants are employed. To preclude damage of this nature, the temperature within bed 12 is continuously monitored by thermal sensor 1TC and the temperature of bed 16 is similarly monitored by sensing device 2TC. The signals from the temperature sensing devices 1TC and 2TC are continuously supplied to heater control logic 51 to afford a means to de-energize regeneration heaters 15 and 19 if overheating of their respective beds 12 and 16 occurs. Thus, the temperature sensing devices 1TC and 2TC afford a back-up or safety function with respect to thermal sensors 4THSR and 3THSR respectively.

The temperature to which either of the dessicant beds 12 and 16 can be cooled in the latter part of the regeneration cycle, prior to resumption of on-stream operation, is of course dependent in part upon the temperature of the regeneration air supplied through blower 26. In those instances in which a relatively low outlet temperature for the dessicant beds is desired for on-stream operation, it may be necessary to adjust the low temperature limit T2 to compensate for changes in ambient temperature. This is made possible by the thermal sensor 2THSR, which continuously monitors the temperature of the regeneration air supplied to blower 26 from filter 27. The temperature signal from sensor 2THSR is supplied to valve control logic 52 and is utilized in the valve control logic to modify the lower thermal threshold T2 as required.

From the foregoing description, it will be apparent that the two principal thermal sensors 3THSR and 4THSR are utilized only during the regeneration mode of the dessicant beds 16 and 12 with which they are respectively associated. If a different construction is used for valve 32 (for instance, the construction illustrated for valve 23), so that the regeneration air is vented through a single valve port, then a single thermal sensor can be substituted for the devices 3THSR and 4THSR. An arrangement of this kind, however, may present some difficulties with respect to operation of heater control logic 51, particularly if the sensors have substantial thermal inertia. Another modification of the principal thermal sensors 3THSR and 4THSR that may be readily effected, with no change in the control operation, is relocation of the sensors to the input side of valve 32, more closely adjacent the dessicant bed outlets 14 and 18.

The regeneration cycle control 11 for dryer 10, as illustrated in FIG. 1, provides for automatic control of regeneration of dessicant beds 12 and 16 in accordance with a parameter which indicates the actual moisture conditions in the dessicant beds, that parameter being the bed outlet temperature. Changes in the moisture content or temperature of the regeneration air supply do not cause substantial variations in the regeneration process; the two dessicant beds are each dried to a consistent moisture content in each regeneration cycle even though the air supply may change appreciably. By the same token, changes in the operation of regeneration heaters 15 and 19, which could result from variations in the available electrical supply or simply from aging of the heaters, does not materially affect the consistency or efficiency of regeneration. Thus, the regeneration cycle control 11 is highly reliable and consistent in operation over a broad range of varying operating conditions. Furthermore, as will be more apparent from the specific solid-state control shown in FIGS. 2–8, the control is relatively simple and economical in construction and affords substantially maintenance-free operation over long periods of time.

Figure 2:
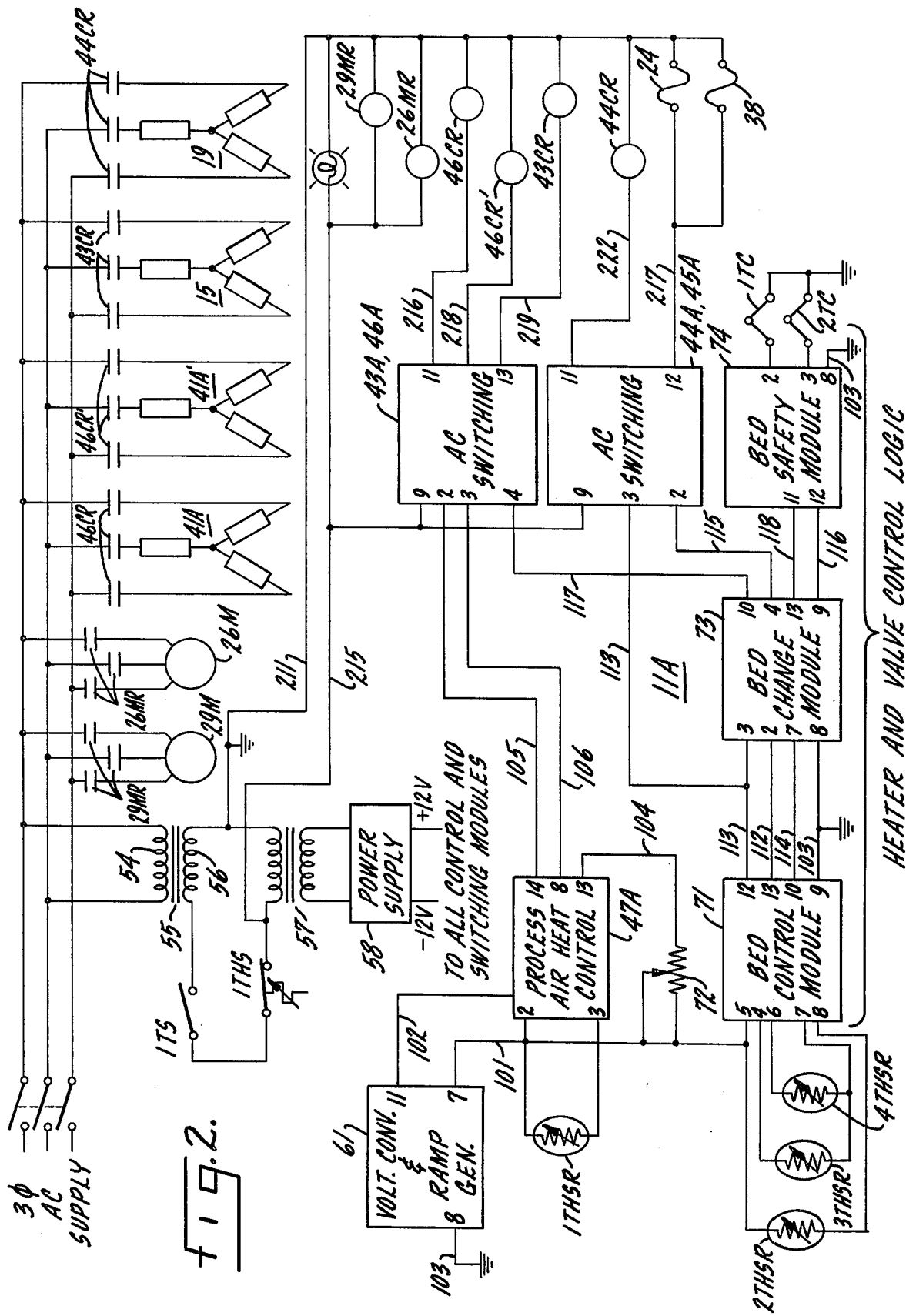
FIG. 2 is a schematic diagram of the principal control elements of a regeneration cycle control for a dual-bed dessicant dryer, constructed in accordance with one embodiment of the present invention.

FIG. 2 affords a more detailed illustration of a regeneration cycle control 11A that is generally similar to the control 11 of FIG. 1, but with some modifications. In FIG. 2, a motor 29M for the process air blower 29 (FIG. 1) is shown connected to a three-phase electrical power supply through the contacts 29MR of a conventional motor contactor. Similarly, the regeneration air blower 26 (FIG. 1) is represented in FIG. 2 by the motor 26M, which is connected to the three-phase AC supply by the contacts 26MR of a conventional motor contactor. The electrical heating element 41 for the process air heater 39 (FIG. 1) is shown in FIG. 2 as two three-phase resistance heater stages, a first stage 41A connected to the AC supply by the series of relay contacts 46CR and a second stage 41A' connected to the AC supply by relay contacts 46CR'. A set of relay contacts 43CR connect the regeneration heater 15 to the AC supply. Similarly, the relay contacts 44CR connect the regeneration heater 19 to the AC supply.

The primary winding 54 of a transformer 55 is connected across one phase of the AC power supply. One terminal of the secondary winding 56 of transformer 55 is connected to a grounded conductor 211. The other terminal of the secondary winding 56 is connected through an on-off switch 1TS and the thermal safety device 1THS to a power conductor 215.

The primary winding of another transformer 57 is connected across the system power lines 211 and 215. The secondary of transformer 57 is connected to a conventional power supply circuit 58 that develops a ±12 volt DC supply for the control and switching modules of system 11A.

The regeneration control 11A of FIG. 2 is constructed as a plurality of control and switching modules. One module 61 comprises a voltage converter that develops a low voltage DC signal, −3 volts, on line 101, pin 7, that is utilized in the operating circuits for the thermistors 1THSR, 2THSR, 3THSR, and 4THSR. Line 101 is also connected to a process air heat control module 47A and to a bed control module 71. A potentiometer 72 is connected from line 101 to pin 13 (line 104) of module 47A to afford a set point control for the outlet temperature of the process air heaters 41A, 41A'.

Control module 61 (FIG. 2) also generates a ramp signal that is supplied to control module 47A to be utilized in control of the process air heaters. By utilizing a ramp signal control in combination with the two-stage heater 41A, 41A', precise control of the duty cycle and accurate control of the temperature of the process air can be achieved. Indeed, control over a duty cycle from virtually zero to 100% can be maintained, and a output temperature within a tolerance of plus or minus 1° F or better can be achieved.

For example, if the process air temperature desired is 200° F, when the actual sense temperature is 170° F both of the heaters 41A and 41A' would be maintained continuously energized. At a higher temperature, for example 185°, the process air heat control 47A establishes a cyclic (ramp) input to one of the heaters, reducing its duty cycle while maintaining the other in continuous operation. At a still higher level, perhaps between 190° and 195°, both of the heaters 41A and 41A' are placed in cyclic operation. At the desired maximum temperature of 200°, one heater is maintained in cyclic operation and the other is de-energized. For the same dryer, when a higher output temperature (e.g., 300°) is required, the final control level may entail maintenance of one heater in continuous operation and cycling of the other.

In the control 11A of FIG. 2, a part of the process air heater energizing circuit 46 (FIG. 1) comprises an AC switching module 43A, 46A which also performs a part of the operations for the regeneration heater energizing circuit 43. For its process air heater energizing functions, this switching module receives two inputs from process air heat control module 47A, one on line 105 and the other on line 106. The switching module is also connected to the power line 215. One output line 216 of the AC switching module 43A, 46A is connected to a control relay coil 46CR to operate the contacts for heater elements 41A. Another output 218 from this AC switching module is connected to the operating coil 46CR' for the relay contacts that control energization of heater elements 41A'. Both of the relay coils 46CR and 46CR' are returned to the ground conductor 211.

The bed control module 71 of the control illustrated in FIG. 2 is connected to the thermal sensors 2THSR, 3THSR, and 4THSR. Module 71 has two outputs 112 and 114 connected to a bed change control module 73, and is also connected to the internal ground 103. Another line 113 interconnects modules 71 and 73, and is also connected to one terminal of a second AC switching module 44A, 45A. The switching circuits in this module comprise components of the regeneration heater energizing circuit 44 and the valve actuator circuit 45 (FIG. 1).

There is an output 117 from the bed change control module 73 to the AC switching module 43A, 46A. The portion of the AC switching module to which this line 117 is connected controls the energization of a control relay coil 43CR connected to the module by a line 219 and also connected to the ground line 211. Coil 43CR controls the relay contacts in the energizing circuit for regeneration heater 15.

Another input to the AC switching module 44A, 45A is afforded by a line 115 from module 73, which controls energization of the two valve solenoids 24 and 38. The solenoids are connected to the switching module by a line 217 and are also connected to the AC ground line 211.

Control 11A further comprises a bed safety module 74 to which the two safety thermal sensors 1TC and 2TC are connected. Module 74 also includes two output connections 116 and 118, to the bed change control module 73, and a ground connection to line 103.

To place control 11A of FIG. 2 in operation, the on/off switch 1TS is closed. This completes a energizing circuit for the two motor contactor coils 29MR and 26MR, thereby energizing the blower motors 29M and 26M. The blowers remain continuously energized as long as the dehumidifying dryer is in operation. The dryer and the control may be shut down at any time by opening switch 1TS. Operation of both the dessicant dryer and the control is interrupted automatically if the thermal sensor 1THS detects an excessive temperature at the output of the process air heater 39 (see FIG. 1). Thermal sensor 1THS is normally set about 20° above the desired temperature level for the process air supply to apparatus 42.

In all other respects, the basic operation of the control 11A illustrated in FIG. 2 proceeds as described above in conjunction with FIG. 1. The logic modules 71, 73 and 74 perform the basic functions of the heater control logic 51 and valve control logic 52 of the first-described embodiment. Accordingly, the operational description does not require repetition.

FIGS. 3 through 8 afford detailed illustrations of circuits that may be utilized, in one embodiment of the control 11A, for all of the control and switching modules. Because the complete circuits and their components are fully shown in the drawings, with the module interconnections identified in these figures and in FIG. 2, an element-by-element description of FIGS. 3–8 is deemed unnecessary. However, some comments about each of the specific circuits are in order.

Figure 3:
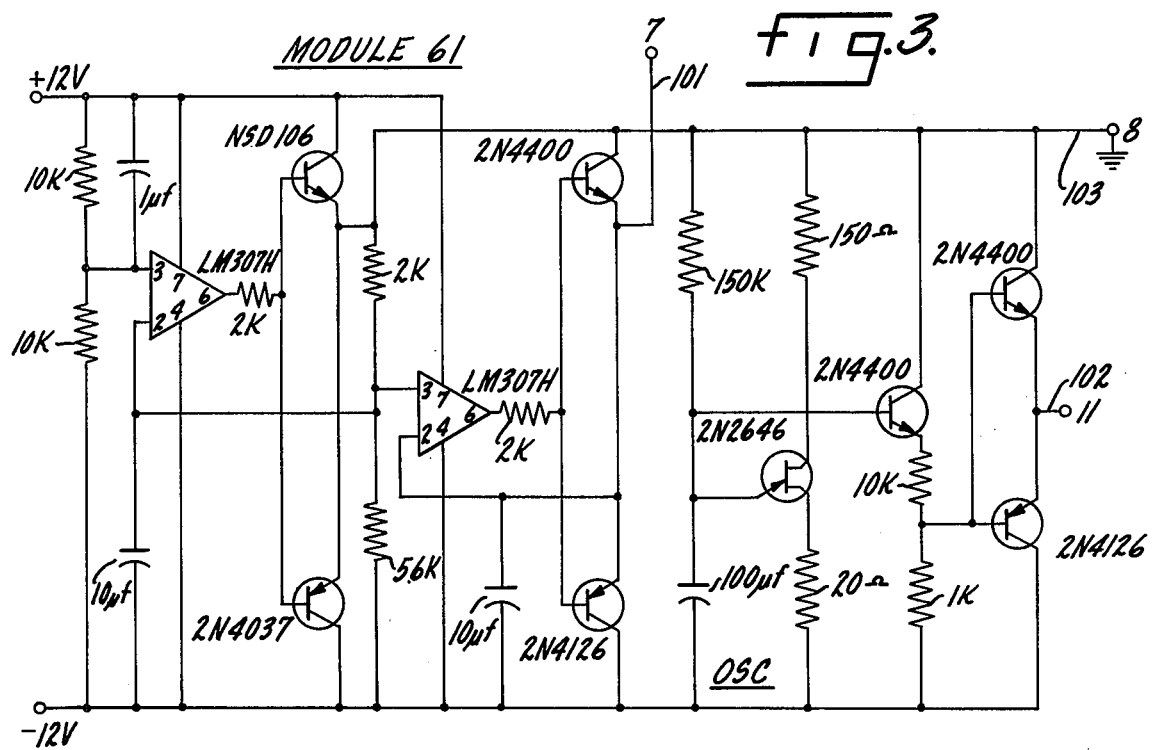

Referring to FIG. 3, it is seen that the left-hand portion of the circuit for the module 61 illustrated therein generates a low DC voltage, in this instance −3 volts, at the module terminal 7, line 101. This voltage is utilized in operation of the thermal sensors 1THSR through 4THSR. The right-hand portion of the circuit of FIG. 3, module 61, is a ramp generator including a FET oscillator, which develops a ramp signal on the module pin 11, conductor 102. This is the ramp signal employed to control operation of the process air heater as described above.

Figure 4:
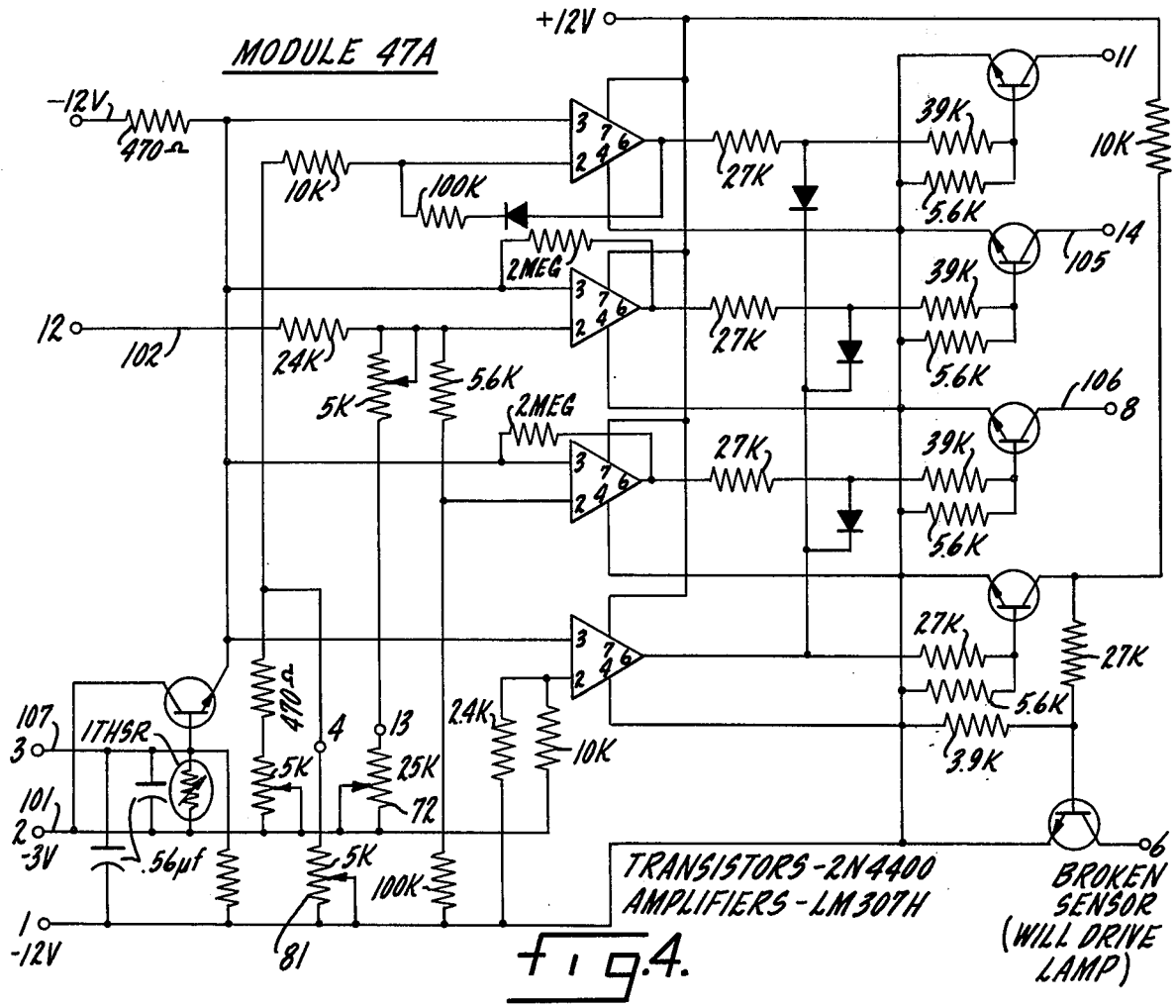

The detailed circuit for the process air heat control module 47A that is illustrated in FIG. 4 includes the remotely mounted potentiometer 72 that is utilized to set the temperature level for the process air. In addition, the specific circuit shown in FIG. 4 includes an additional potentiometer 81 employed to set a safety temperature level somewhat above the temperature level established by the setting of potentiometer 72. The air safety potentiometer 81 controls the operating level for a safety output signal, on pin 11 for this module, that is not illustrated in FIG. 2. The safety output from module 47A is employed to shut off the process air heater 39 (FIG. 1) entirely if an excessive temperature is detected by the thermal sensor 1THSR, which is also included in the specific circuit of FIG. 4. Thus, an additional safety backup to the sensor 1THS (see FIGS. 1 and 2) is provided when the specific circuit shown in FIG. 4 is employed.

The particular circuit for module 47A shown in FIG. 4 also includes another output, at module pin 6, that is not shown in the overall circuit illustration of FIG. 2. This output is utilized to energize a indicator lamp in the event of a failure of the thermal sensor 1THSR.

Figure 5:
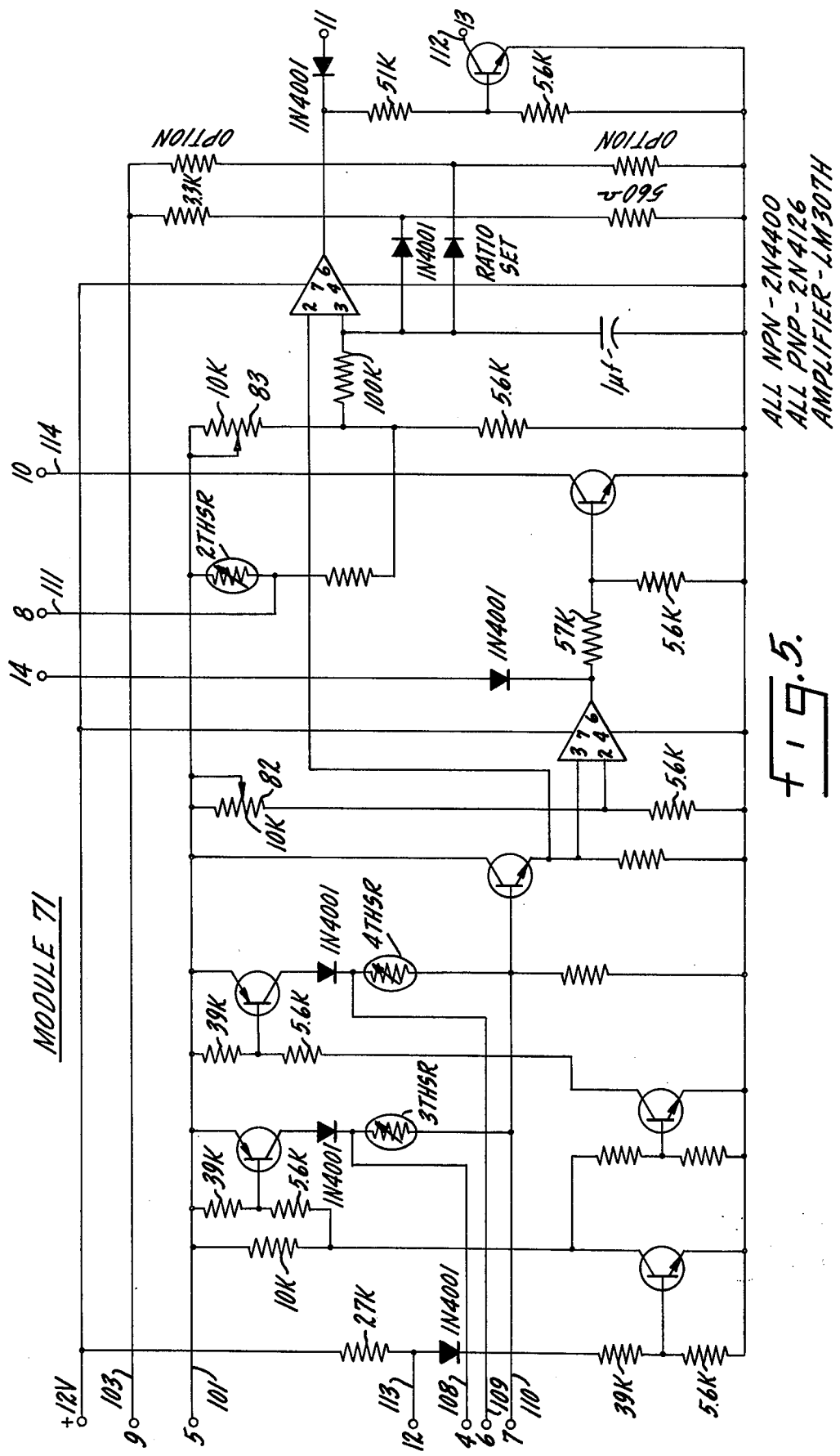

The specific circuit for the bed control module 71 that is illustrated in FIG. 5 includes a potentiometer 82 that is employed to adjust the high temperature limit T1 which determines the deenergization of the regeneration heater. Another potentiometer 83 in this circuit is utilized to set the low temperature limit T2 that signals the changeover for the two dessicant beds between their regeneration and on-stream modes of operation. The thermal sensors 2THSR through 4THSR are shown integrally with the remainder of the circuitry of module 71 in FIG. 5, but actually are mounted externally as indicated in FIGS. 1 and 2.

Figure 6:
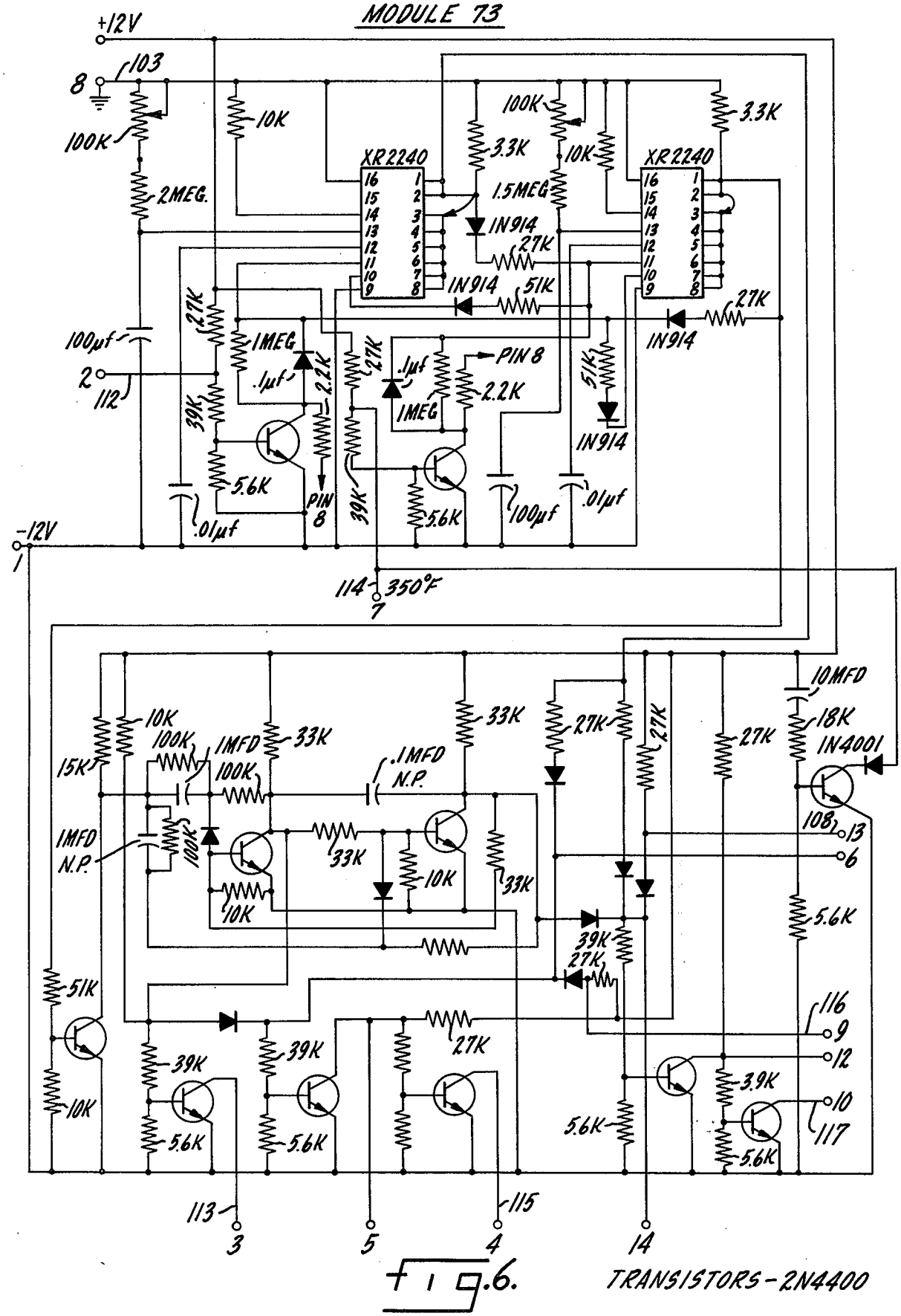

A complete operating circuit for the bed change control module 73 is illustrated in FIG. 6; FIG. 6A affords a simplified representation of the basic circuits for this module, to which reference may be made for overall operation of the circuit. Referring to FIGS. 6 and 6A, when the dryer and control system are placed in operation, a signal is supplied to the input at module pin 2, on line 112, to establish the initial mode of operation. This signal sets the heater control flip-flop. The output on module pin 4, line 115, goes to a logical high, to provide for energization of the regeneration heater 19 for bed 16 (FIG. 1). Further, at this time the input on module pin 5, line 113 (FIGS. 6, 6A), goes to a logical low to de-energize valve solenoids 24 and 38 and thereby establish dessicant bed 16 in the regeneration mode and bed 12 in the on-stream mode (FIG. 1).

This mode of operation continues until the temperature in bed 16 rises to the level T1 which may, for example be 350° F. At this point, a logical high input signal at pin 7, line 114 (FIGS. 6, 6A), resets the heater control flip-flop and also sets the cycle control flip-flop to produce a logical low signal at pin 4, line 115, de-energizing the regeneration heater 19 for bed 16. This initiates the cooling portion of the regeneration cycle as described above and continues until the temperature and the dessicant bed 16 falls to the level T2 (e.g., 150° F.). At this time the heater control flip-flop is again set by a input signal at pin 2, line 112, and the cycle control flip-flop is reset. Under these conditions, a logical high output signal is developed at pin 10, line 117, to energize the regeneration heater 15 for the other dessicant bed 12. Simultaneously, the output on pin 5, line 113 that controls the valve circuits goes to a logical high, changing bed 12 to the regeneration mode and bed 16 to the on-stream mode. In this manner, with appropriate input signals from module 71, FIGS. 5, the bed change module 73 of FIGS. 6 and 6A performs the basic heater control and valve control functions of circuits 51 and 52 as described in conjunction with FIG. 1.

Module 73, FIGS. 6 and 6A, receives two safety inputs from module 74, at pin 9, line 116, and pin 10, line 117, to override the normal control inputs and de-energize the regeneration air heaters in the event of overheating of either dessicant bed. FIG. 7 illustrates a specific circuit used in module 74 to develop the safety signals. Two such circuits are employed, one for each of the sensors 1TC and 2TC, only the circuit for sensor 1TC being illustrated. The thermal sensor 1TC is shown as an integral part of the circuit of module 74 (FIG. 7) but actually is mounted externally as clearly indicated in FIG. 1.

FIG. 8 illustrates the AC switching circuits employed in the modules 43A–46A. A total of six such switching circuits may be required.

The invention has been described and illustrated as applied to a dual-bed dessicant dryer in which one bed is always on-stream and the other bed is being regenerated. However, the invention can equally well be applied to a dryer having a single dessicant bed. For an arrangement of this kind, the circuit remains virtually unchanged except that only one thermal sensor (3THSR or 4THSR) for sensing the bed outlet temperature is required, and only a single bed temperature sensing device (1TC or 2TC) is needed for safety control.

I claim:

1. A control for a gas dryer of the kind comprising first and second dessicant beds each having an inlet and an outlet, regeneration heater means for heating gas supplied to the respective bed inlets, and valve means, connected to the bed inlets and the bed outlets, actuatable between alternate operating conditions including a first operating condition, in which the first bed is in an on-stream mode with its outlet connected to a process apparatus gas intake and its inlet connect to the exhaust of the process apparatus and the second bed is in a regeneration mode with its outlet diverted from the process apparatus and its inlet connected to a regeneration air supply, and a second operating condition in which the inlet and outlet connections of the beds are reversed with the first bed in regeneration mode and the second bed in on-stream mode, the control comprising:

bed outlet thermal sensor means for sensing the bed outlet temperature for each bed when the bed is in its regeneration mode;

valve control means for actuating the valve means between the first and second operating conditions;

heater control means, having inputs from the bed outlet thermal sensor means and from the valve control means, for energizing the regeneration heater means to heat gas supplied to the bed that is in its regeneration mode, following the initiation of an operating cycle, until the outlet temperature of that bed increases to a first temperature limit T1, and then de-energizing that regeneration heater means;

the valve control means having inputs from the bed outlet thermal sensor means and from the heater control means, for actuating the valve means to its alternate operating condition to initiate a new cycle, following de-energization of the regeneration heater, when the bed outlet temperature reduces to a second temperature limit T2, where T1 > T2;

and a regeneration air thermal sensor, for sensing the temperature of the regeneration air supply, coupled to the valve control means to modify the second temperature limit T2 in response to variations in the regeneration air supply.

2. A control for a dessicant gas dryer, according to claim 1 and further comprising:

safety sensing means for sensing the temperature of each dessicant bed, coupled to the heater control means to de-energize the regeneration heater means whenever the dessicant bed in regeneration mode exceeds a safe temperature.

3. A control for a gas dryer, according to claim 1, in which the bed outlet thermal sensor means comprises two thermal sensing devices, one located in the outlet path for each dessicant bed, and in which the valve means includes an outlet directional control valve having two intake ports each connected to one bed outlet, two regeneration exhaust ports, each vented to the atmosphere, and a on-stream outlet port connected to the process apparatus gas intake, the two thermal sensing devices comprising the bed outlet thermal sensing means each being mounted in a respective one of the regeneration exhaust ports.

4. A control for a gas dryer, according to claim 1, in a dryer which includes an on-stream process gas heater, including first and second heating elements, connected to the process apparatus gas intake, in which the control further comprises:

a ramp signal generator;

a process gas thermal sensor for sensing the temperature of the heated gas supplied to the process apparatus gas intake;

and process gas temperature control means, having inputs coupled to the ramp signal generator and the process gas thermal sensor and individual outputs coupled to the heating elements, for varying the energization of each heating element from a continuously energized condition at a given low process gas temperature to a periodically energized condition at a given high process gas temperature.

5. A control for a gas dryer, according to claim 4, in which the process gas temperature control means includes means to de-energize one of the heating elements at a given high process gas temperature.

6. A control for a gas dryer of the kind comprising a dessicant bed having an inlet and an outlet, a regeneration heater in the bed inlet, valve means, connected to the bed inlet and the bed outlet, actuatable between an on-stream condition, in which the bed outlet is connected to a process apparatus gas intake and the bed inlet is connected to the exhaust of the process apparatus, and a regeneration condition, in which the bed outlet is diverted from the process apparatus and the bed inlet is connected to a regeneration gas supply, and valve actuating means for actuating the valve means to regeneration condition, the control comprising:

a thermal sensor for sensing the bed outlet temperature;

heater control means, having inputs from the thermal sensor and the valve actuating means, for energizing the regeneration heater upon actuation of the valve means to regeneration condition until the bed outlet temperature increases to a first temperature limit T1, and then de-energizing the heater;

valve control means having inputs from the heater control means and the thermal sensor, for controlling the valve actuating means to actuate the valve means to on-stream condition and terminate the regeneration cycle following de-energization of the regeneration heater, when the bed outlet temperature reduces to a second temperature limit T2, where T1 > T2;

and a second thermal sensor for sensing the temperature of the regeneration gas supply, the valve control means including means for adjusting the temperature limit T2 in response to changes in the regeneration gas supply temperature.

7. A control for gas dryer of the kind comprising first and second dessicant beds each having an inlet and an outlet, regeneration heater means for heating gas supplied to the respective bed inlets, valve means, connected to the bed inlets and the bed outlets, actuatable between alternate operating conditions including a first operating condition, in which the first bed is in a on-stream mode with its outlet connected to a process apparatus gas intake and its inlet connected to the exhaust of the process apparatus and the second bed is in a regeneration mode with its outlet diverted from the process apparatus and its inlet connected to a regeneration air supply, and a second operating condition in which the inlet and outlet connections of the beds are reversed with the first bed in regeneration mode and the second bed in on-stream mode, and on-stream process gas heater means including a heating element connected to the process gas intake, the control comprising:

bed outlet thermal sensor means for sensing the bed outlet temperature for each bed when the bed is in its regeneration mode;

valve control means for actuating the valve means between the first and second operating conditions;

heater control means, having inputs from the bed outlet thermal sensor means and from the valve control means, for energizing the regeneration heater means to heat gas supplied to the bed that is in its regeneration mode, following the initiation of a operating cycle, until the outlet temperature of that bed increases to a first temperature limit T1, and then de-energizing that regeneration heater means;

the valve control means having inputs from the bed outlet thermal sensor means and from the heater control means, for actuating the valve means to its alternate operating condition to initiate a new cycle, following de-energization of the regeneration heater, when the bed outlet temperature reduces to a second temperature limit T2, where T1 > T2;

and the control further comprising;

a ramp signal generator;

a process gas thermal sensor for sensing the temperature of the heated gas supplied to the process apparatus gas intake;

and process gas temperature control means, having inputs coupled to the ramp signal generator and the process gas thermal sensor and an output coupled to the heating element, for varying the energization of the heating element from a continuously energized condition at a given low process gas temperature to a periodically energized condition at a given high process gas temperature.

8. A control for a gas dryer, according to claim 7, in which the process gas temperature control means includes means to de-energize the heating element at a given high process gas temperature.

* * * * *